(12) United States Patent
Parrinello

(10) Patent No.: US 7,156,643 B2
(45) Date of Patent: Jan. 2, 2007

(54) MACHINE FOR FORMING MISCELLANEOUS ARTICLES, SUCH AS CAPS, BY COMPRESSION MOLDING

(75) Inventor: Fiorenzo Parrinello, Medicina (IT)

(73) Assignee: Sacmi-Cooperativa Meccanici Imola Soc. Coop. A.R.L., Imola (IT)

( * ) Notice: Subject to any disclaimer, the term of this patent is extended or adjusted under 35 U.S.C. 154(b) by 417 days.

(21) Appl. No.: 10/754,633

(22) Filed: Jan. 12, 2004

(65) Prior Publication Data

US 2004/0208947 A1 Oct. 21, 2004

(30) Foreign Application Priority Data

Jan. 13, 2003 (IT) .................... RE2003 A 000001

(51) Int. Cl.
  *B28B 3/02* (2006.01)
  *B29C 43/08* (2006.01)
(52) U.S. Cl. ........................ 425/345; 425/344; 425/804
(58) Field of Classification Search ................ 425/344, 425/345, 804; *B29C 43/08*
  See application file for complete search history.

(56) References Cited

U.S. PATENT DOCUMENTS 3,294,235 A * 12/1966 Pitkin et al. ................ 209/539
5,007,150 A * 4/1991 Alieri et al. .................. 29/33 J
5,807,592 A 9/1998 Alieri

* cited by examiner

Primary Examiner—Joseph S. Del Sole
Assistant Examiner—Maria Veronica Ewald
(74) Attorney, Agent, or Firm—Browdy and Neimark, PLLC

(57) ABSTRACT

Machine for forming caps by compression molding comprising: a first carousel rotating about a central axis and provided peripherally with a plurality of compression molding units mounted equidistant from each other and from the axis of rotation, said units comprising an upper punch and a lower die provided with a cavity, said punch and die being mutually movable along a common vertical axis in response to suitable operating means; a second carousel rotating about a central axis parallel to that of the first carousel and provided peripherally with means for feeding the charge of material to be molded to the die cavities of the first carousel, and means for collecting the molded caps abandoned by the punches of the first carousel; means for feeding charges of material to be molded to said second carousel; a possible third carousel provided peripherally with means for guiding and conveying the caps abandoned by the second carousel; said first and second carousel and said second and possible third carousel having their respective means positioned on circumferences which are mutually tangential at one point; comprising at least one further second carousel associated both with respective means for feeding the material to be molded and with the possible third carousel, such as to form a system having at least two second carousels distributed angularly equidistant external to the first carousel, so that each mould implements at least two forming cycles for each revolution of the carousel, the two cycles being effected along travel arcs of the first carousel which are at least partly superposed.

8 Claims, 3 Drawing Sheets

MACHINE FOR FORMING MISCELLANEOUS ARTICLES, SUCH AS CAPS, BY COMPRESSION MOLDING

FIELD OF THE INVENTION

The present invention relates to machines for forming articles, in particular closure caps, by compression molding.

The ensuing description specifically relates to caps, but can equally relate to articles other than caps.

Such machines are known for example from U.S. Pat. No. 5,807,592 in the name of the same applicant.

Said machines comprise a rotating carousel for compression molding comprising a support element rotating about a central vertical axis.

A plurality of compression molding units are mounted on the support element equidistant from each other and from the axis of said carousel.

Each of said units comprises a fixed upper punch and a lower mould provided with a cavity and movable vertically to engage and disengage the fixed upper punch.

Machines are also known in which both the lower mould and the upper punch or just the upper punch alone are movable, but this does not modify that stated hereinafter.

Means are provided to rotate said support element such that each molding unit undergoes a path of travel comprising a loading station for the material to be molded, a molding zone, a cooling zone and a zone for discharging the molded cap.

The loading zone for the material to be molded and the cap discharge zone can be perfectly superposed, so that the two operations can be substantially simultaneous.

Means are provided for causing said upper punches and said lower moulds to approach and withdraw from each other during rotation of the support element.

The loading and discharge operations take place with the aid of at least one second carousel, known as the loading and discharge carousel, the active means of which follow a trajectory tangential to the trajectory of the mould on the support element, said operations being effected at the actual point of tangency.

Of the said operations, the more delicate is the loading of the material charge to be molded, which must take place within a certain limited time if control of the characteristics of the material loaded into the mould cavity is to be maintained.

The time which passes between loading one charge into the mould and loading the next charge into the same mould defines the duration of one cap forming cycle, which is dictated by plant requirements.

The duration also comprises a time, known as the stoppage time, during which the mould, once the cap has been formed, has to remain inactive for safety reasons in order to enable the carousel to halt should difficulties arise.

The stoppage time corresponds to an arc of rotation of the carousel known as the stoppage arc, which is generally defined by the number of inactive moulds.

The stoppage arc, which depends on inertial problems, is proportional to the square of the rotational speed of the carousel.

There is therefore a compromise situation between the number of moulds on which the carousel diameter depends, and the carousel speed, which as stated influences the stoppage arc, this compromise enabling the characteristics of the carousel to be optimized on the basis of the desired production rate.

The time required by the charge loading operation evidently limits the rotational speed of the carousel, this drawback being at least partly obviated by the said U.S. Pat. No. 5,807,592 in the name of the same applicant, in which the loading and discharge carousel not only rotates about its axis but can also be shifted slightly to enable the loading means to remain over the mould cavity for a time exceeding the normal overlying time at the point of tangency.

The invention of said U.S. Pat. No. 5,807,592 presents not only a productivity limit depending on the rotational speed of the carousel carrying the moulds, but also a considerable mechanical complication due to the need to shift the axis of the loading and discharge carousel at each operation.

Any increase in the carousel speed beyond the defined optimum speed is in effect prevented by the increase in the stoppage arc, which as seen is proportional to the square of the speed.

SUMMARY OF THE INVENTION

The object of the present invention is to increase the production rate while at the same time also increasing the time available for loading the material charge to be molded, for a carousel having the aforedefined optimum characteristics.

This object is attained by a machine having the characteristics defined in the claims.

The simultaneity of the loading and discharge operations introduced by U.S. Pat. No. 5,807,592, which has enabled the production rate to be increased, is associated according to the invention with different modalities for feeding the charge.

The machine of the invention presents a carousel having a diameter and a rotational speed such that during one complete revolution of the carousel at least two molding cycles are achieved for each mould, said cycles being also able to be partly concurrent.

This solution offers advantages which are already apparent even if only two cycles are to be achieved for each revolution of the carousel.

Taking as reference a carousel of the aforedefined optimum characteristics effecting one cycle for each revolution, if two cycles are to be effected for each revolution the rotational speed has to be halved to respect the cycle duration.

However by halving the speed each of the two cycles will have a stoppage arc available which is four times that required for safety reasons.

If the stoppage arc is defined by the number of moulds which have to remain inactive, and said number is equal to x for a certain rotational speed, then for a rotational speed which is halved said number becomes equal to $2^2x$.

This not only enables a greater time to be available for loading the mould, but also enables the machine productivity to be further increased by simply resetting the stoppage arc to the value necessary to maintain safety.

If then the two cycles for forming a cap in the same mould are partly superposed, namely during the loading of the charge and during discharge of the cap, the aforesaid synergic effect is further increased.

According to this preferential embodiment, each of the devices provided along the carousel circumference loads the charge of the next cycle and discharges the cap of the previous cycle.

In conformity with the invention each cap is completely formed, starting with the loading of the charge and finishing with the discharge of the cap, within a path of travel exceeding that fraction of a revolution of the carousel undergone by each individual loading and discharge means associated with the carousel.

This enables a carousel rotational speed, and hence a productivity, to be chosen between the speed undergone by the carousel if associated with a single device and the sub-multiple of said speed equal to the number of loading and discharge devices associated with the carousel.

It has been found that, with reference to the maximum allowable speed of a carousel provided with a single loading and discharge device, a speed reduced by one third is advantageous for the same carousel provided with two loading and discharge devices.

This enables the production to be increased by forty percent, while having a time period available for loading the charge which is increased by thirty percent.

The merits and the constructional and operational characteristics of the invention will be apparent from the ensuing detailed description with reference to the accompanying drawings, which illustrate a preferred embodiment thereof given by way of non-limiting example.

DESCRIPTION OF THE PREFERRED EMBODIMENT

Figure 1:
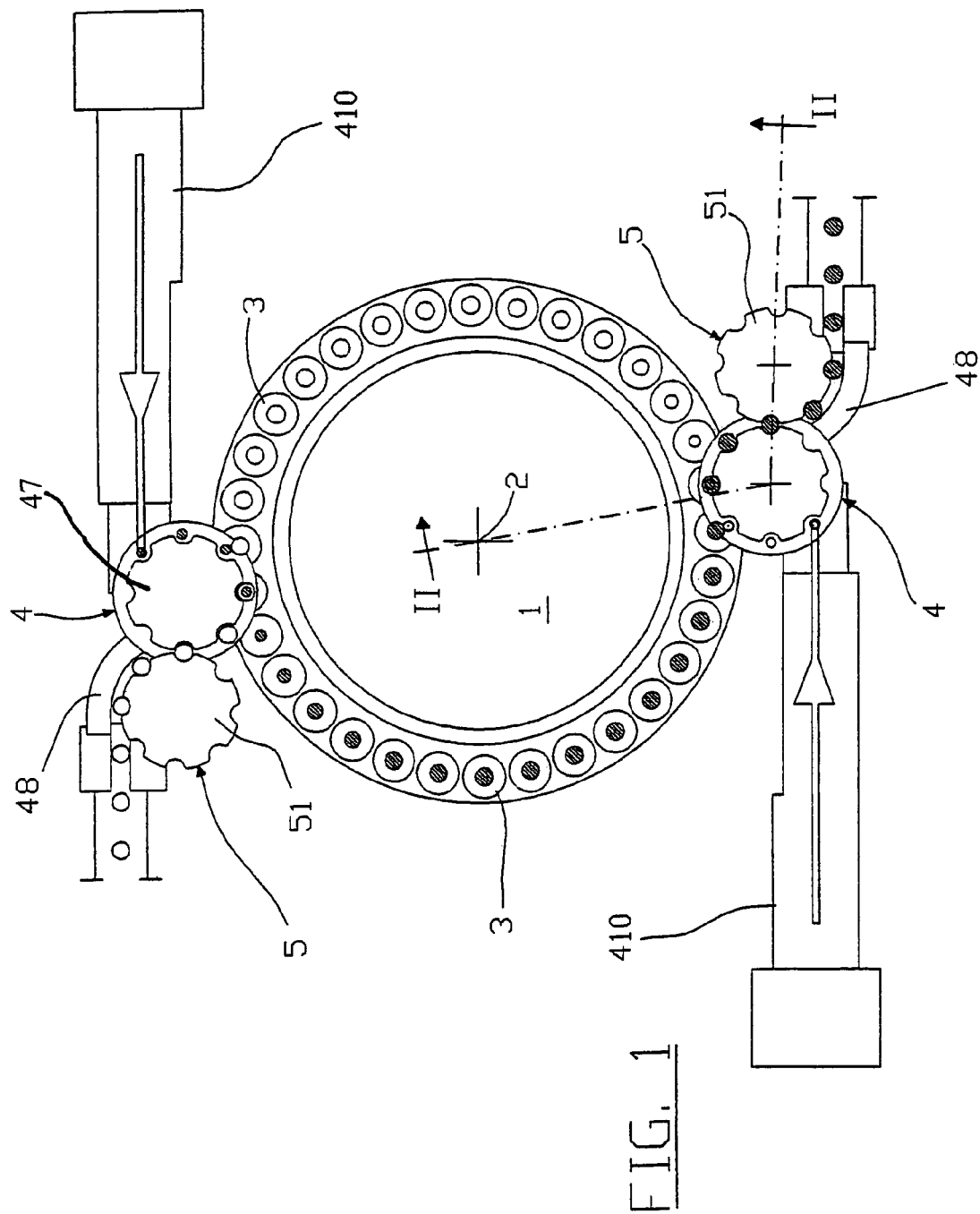
FIG. 1 is a schematic plan view of a forming machine according to the invention.

The figures show a first carousel 1 which rotates about a vertical axis 2 and carries, aligned and equidistant along a circumference, a certain number of molding stations 3 each of which comprises an upper punch 31 and a lower die 32 arranged to define, in its simplest version, a forming cavity 320.

External to the carousel 1 there are positioned, in diametrically opposite positions, two second carousels 4 for loading the charge and discharging the cap.

In series with each of the second carousels 4 for loading the charge and simultaneously discharging the cap, there is positioned a third carousel 5 provided with a star member 51, for removing the caps withdrawn by the second carousel.

The means for synchronously rotating the carousel 1, the carousel 4 and the carousel 5 are not described as they are well known to the expert and are sufficiently illustrated in the aforesaid U.S. Pat. No. 5,807,592 in the name of the same applicant.

Figure 2:
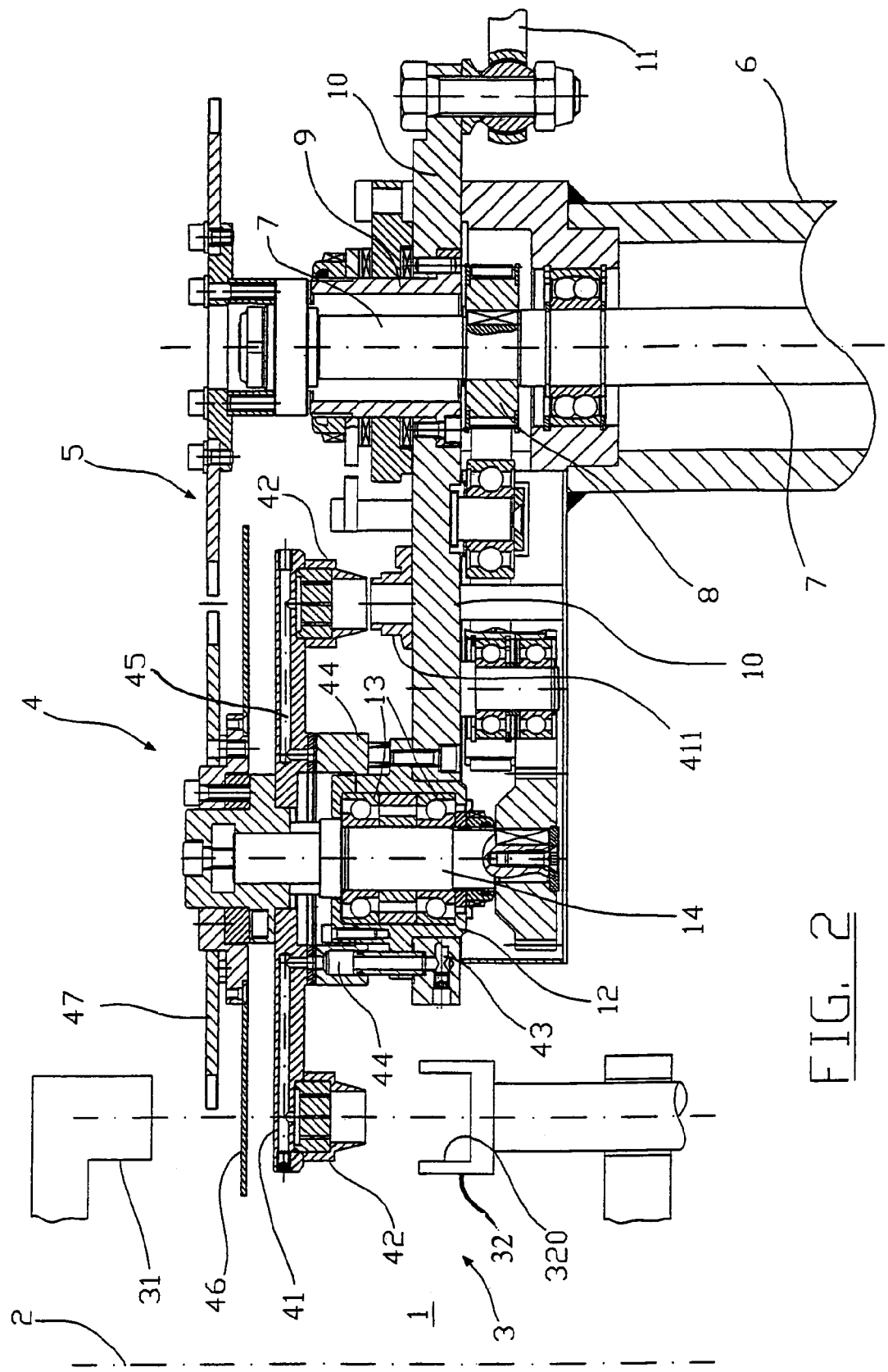
FIG. 2 shows the section II—II of FIG. 1.
Figure 3:
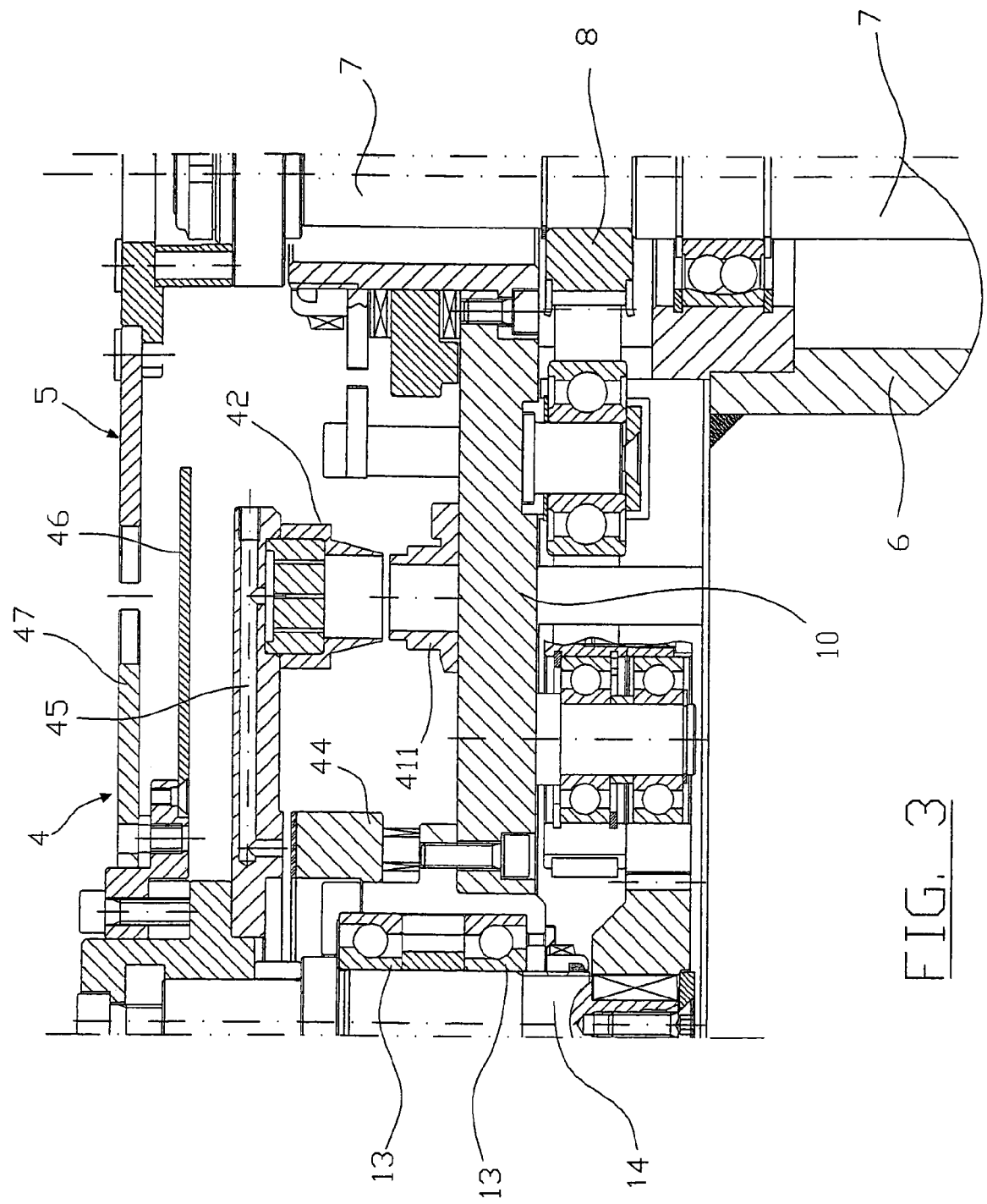
FIG. 3 is an enlarged portion of FIG. 2.

With each of the carousels 4 there are associated means for feeding charges of synthetic material to be molded, said means consisting, in the illustrated example, of an extruder 410 which feeds a charge emission nozzle 411 shown in FIG. 2.

With particular reference to FIG. 2, this shows a portion 6 of the machine bed on which the carousel 1 rotates.

The portion 6 houses a motorized shaft 7 carrying the third carousel 5 at its top, and a pulley 8 keyed onto an intermediate zone.

With the shaft 7 there is associated a rotatable bush 9 carrying a laterally projecting shelf 10. The shelf 10 is maintained in the desired position by a cylinder-piston unit of which only the piston rod 11 is visible.

By way of a bush 12 and bearings 13, the shelf 10 supports a rotatable shaft 14, to the top of which the second carousel 4 is fixed.

The lower end of the shaft 14 carries a pulley 15 which is rotatably connected to the pulley 8 of the shaft 7 by way of a toothed belt 16, the intermediate pulley 17 and the toothed belt 18.

The carousel 4 comprises a base plate 41 keyed onto the shaft 14 and provided with charge withdrawal cups 42 positioned equidistant along a circumference and each connected to pneumatic apparatus.

Said pneumatic apparatus comprises a circular channel 43 provided within the shelf 10 and connected by vertical conduits to an annular distributor 44 on which there sealedly slide the ends of conduits 45 connected to the perforated base of the cups 42.

Above the plate 41 there is a star plate 47 above which the star member 51 is positioned.

It should be noted that the circumference along which the cups 42 are aligned is tangential to the circumference along which the punches 31 and the relative lower dies 32 are aligned.

At a point external to the carousel 4 there is a nozzle 411 fed by the extruder 410, and by which the material charges to be molded are emitted.

Said nozzle 411 is visible in FIG. 2, and is aligned vertically with the circumference along which the cups 42 are aligned, it being external to the shelf 10.

The machine operates in the following manner.

For simplicity, it will be described with reference only to one forming cycle between two loading and discharge stations, relative to one half a revolution of the carousel 1.

The extruder 410 feeds the carousel 4 with a series of material charges which leave one by one from the nozzle 411 and are collected by the cups 42 as these pass above the nozzle; the charges remain in the cups by spontaneous adhesion.

The carousel 4 rotates in phase and in synchronism with the rotation of the carousel 1, so that the cups 42 become successively aligned with the cavities 320 of the dies 32.

The cavities 320 are empty, as the cap which has just been molded lies mounted on the punch 31 which is now spaced from the respective cavity 320.

The charge is made to fall into the respective cavity by the pneumatic apparatus which are well known and are therefore not described in further detail.

Simultaneously with the loading of the charge, suitable additional pneumatic means, not shown, present in the punch 31 cause the cap just formed to fall onto the plate 46, recesses in the circumference of the star plate 47.

During the rotation of the carousel 4, the caps maintained equidistant by the star plate 47 are led to the star member 51 of the carousel 5 which rotates synchronously and in phase with the star plate 47. The star member 51 carries the caps to a fixed discharge chute 48 (FIG. 1) located adjacent and coplanar to the plate 45.

Having loaded the charge, the forming cycle commences with the raising of the mould cavity 320 until it receives the punch 31, with the simultaneous formation of the cap by compressing the charge, followed by a stage in which the mould is cooled and opened.

The open mould with the cap mounted on the punch reaches that carousel 4 diametrically opposite to that in which the charge was loaded, and the cycle is repeated.

It is apparent from the aforegoing that for each complete revolution of the carousel two caps are molded, each along a path bounded by one of the described loading and discharge stations, said two cycles being partially simultaneous with the loading of the charge and the discharge of the cap.

The third carousel could also be omitted, and the caps abandoned by the second carousel be removed in another manner.

What is claimed is:

1. A machine for forming caps by compression molding comprising: a first carousel rotating about a central axis and provided peripherally with a plurality of compression molding units mounted equidistant from each other and from the axis of rotation, said units comprising an upper punch and a lower die provided with a cavity, said punch and die being mutually movable along a common vertical axis in response to suitable operating device: an extruder feeding apparatus which feeds charge material to a second carousel; the second carousel rotating about a central axis parallel to that of the first carousel and having peripheral feeding and collection apparatus which respectively feeds the charge of material to be molded to a molding unit of the first carousel, and collects molded caps released from said punch of a molding unit of the first carousel; said molding units and said feeding and collection apparatus respectively located on the circumference of the first carousel and the circumference of the second carousel so as to be mutually tangential at one point; wherein at least one additional second carousel is provided to form a system having the at least two second carousels distributed angularly equidistant external to the first carousel, wherein a diameter and rotational speed of the first carousel relative to that of the two second carousels is set so that each molding unit implements at least two forming cycles for each revolution of the first carousel.

2. A machine as claimed in claim 1, wherein at least one third carousel provided peripherally with means for guiding and conveying the caps molded by the second carousel.

3. A machine as claimed in claim 1, wherein the forming cycles are effected along travel arcs of the first carousel which are at least partly superposed.

4. A machine as claimed in claim 1, wherein said second carousel is connected to a motion transmission device which rotates the second carousel in phase and in synchronism with the first carousel.

5. A machine as claimed in claim 2, wherein the second and the third carousel are connected together by motion transmission apparatus which cause them to rotate in synchronism with each other and with the first carousel.

6. A machine as claimed in claim 1, wherein said second carousel comprises two superposed coaxially rotating plates for respectively feeding the charge material to the cavity of the first carousel and simultaneously collecting the cap from the first carousel.

7. A machine as claimed in claim 1, wherein said third carousel comprises a star-shaped plate for the spaced-apart withdrawal of the caps from the second carousel.

8. A machine as claimed in claim 1, wherein the feeding apparatus of the second carousel has downwardly open cups engaged with pneumatic apparatus which retains and releases the charge material.

* * * * *